United States Patent [19]

Furutani

[11] Patent Number: 5,323,073
[45] Date of Patent: Jun. 21, 1994

[54] METHOD FOR MANUFACTURING A CLAD METAL COLUMN FOR A LINEAR MOTOR

[75] Inventor: Masaharu Furutani, Kitakyushu, Japan

[73] Assignee: Shinko Metal Products Co., Ltd., Kitakyushu, Japan

[21] Appl. No.: 20,718

[22] Filed: Feb. 22, 1993

Related U.S. Application Data

[62] Division of Ser. No. 712,813, Jun. 10, 1991.

[30] Foreign Application Priority Data

Apr. 5, 1991 [JP] Japan ................... 3-101865

[51] Int. Cl.$^5$ ............................ H02K 41/00
[52] U.S. Cl. ............................. 318/12
[58] Field of Search .......... 310/12; 29/517, 596

[56] References Cited

U.S. PATENT DOCUMENTS 3,792,603  2/1974  Orain ................... 29/517 X
4,419,804  12/1983  Axthammer ............ 29/434

Primary Examiner—Steven L. Stephan
Assistant Examiner—Judson H. Jones
Attorney, Agent, or Firm—Armstrong, Westerman, Hattori, McLeland & Naughton

[57] ABSTRACT

A method of manufacturing a clad metal column for linear motor, wherein a core material provided with a convex-and-concave pattern consisting of many longitudinal, transverse, or slanted grooves, or the combination thereof on its peripheral surface is inserted into a pipe made of a good conductor, and said pipe is fit tight onto the peripheral surface of above-mentioned core material by the reduction of diameter of pipe by means of drawing or extrusion.

1 Claim, 2 Drawing Sheets

METHOD FOR MANUFACTURING A CLAD METAL COLUMN FOR A LINEAR MOTOR

This ia continuation of application Ser. No. 07/712,813, filed Jun. 10, 1991.

BACKGROUND OF THE INVENTION

The present invention relates to a clad metal column for a linear motor which is used for elevators, etc., driven by a linear motor, and the method of manufacturing thereof.

In recent years, elevators driven by a linear motor have been developed, and those linear-motor-driven elevators have employed clad metal columns, each of which consists of a magnetic steel column whose periphery is shielded with an aluminum pipe which is a good conductor. And, in manufacturing said clad metal column, a steel column is shielded with an aluminum pipe which is cladded by shrinkage fit or chilled fit.

However, in the actual use of the above-mentioned clad metal column, there has been a problem that the core material and the aluminum pipe are liable to separate in the longitudinal direction caused by the shearing force due to the thrust force generated thereon.

Further, if the bonding force between the core material and the aluminum pipe is deficient in the practice of employing a screw connection for connecting a large number of clad metal columns, a twisting torque is applied to the outer aluminum pipe and, as a result, only the outer aluminum pipe rotates and a sufficient torque cannot be transmitted to the inner core material.

SUMMARY OF THE INVENTION

The present invention has been made in view of the above-mentioned circumstances and, accordingly, it is an object of this invention to provide a clad metal column for a linear motor which has a strong bonding force between an outer pipe made of a good conductor and a core material made of magnetic substance, and the method of manufacturing thereof.

The clad metal column for a linear motor according to the present invention with the object mentioned above comprises a core material provided with a threaded portion for connection at both ends and, further, is constructed of a magnetic substance on the peripheral surface of which a convex-and-concave pattern including many longitudinal, transverse, or slanted grooves, or the combination thereof, is formed, and a pipe made of a good conductor which is tight fit onto the outer periphery of said core material by making the inner surface of the pipe bite into the grooves formed by said convex-and-concave pattern.

In addition, the method of manufacturing aforesaid clad metal column comprises a process to form a convex-and-concave pattern including many longitudinal, transverse, or slanted grooves, or the combination thereof, on the peripheral surface of the core material made of magnetic substance, both ends of which have a threaded portion for connection, a process to insert said core material on which the convex-and-concave pattern is formed into a pipe made of a good conductor, and a process to fit said pipe tightly onto the core material by reducing the diameter of the pipe by means of drawing or extrusion (including push out working).

Here, the shape of above-mentioned core material includes a cylindrical body besides a column.

In the case of the clad metal column for a linear a motor relating to the present invention, because the convex-and-concave pattern consisting of many longitudinal, transverse, or slanted grooves, or the combination thereof is formed on the overall surface of core material, and the inner surface of outer pipe made of a good conductor is made to bite into the grooves formed by said convex-and-concave pattern, a large strength is ensured between the outer pipe and the inner core material, and the shearing-tensile force in the longitudinal and rotating direction is improved.

And, in the method of manufacturing thereof, since the core material on the surface of which a convex-and-concave pattern is formed is inserted into the pipe made of a good conductor and the pipe is drawn or extruded, the method of manufacturing the clad metal column is simplified because the inner side of the diameter-reduced pipe made of a good conductor is bitten easily into the grooves of the convex-and-concave pattern formed on the surface of core material.

Accordingly, in the case of a clad metal column for a linear motor relating to the present invention, the torque generated during screwing can be transmitted smoothly from the outer pipe to the core material and, further, the outer pipe is not separated from the inner core material due to the thrust force generated during operation.

DESCRIPTION OF THE PREFERRED EMBODIMENT

Figure 1:
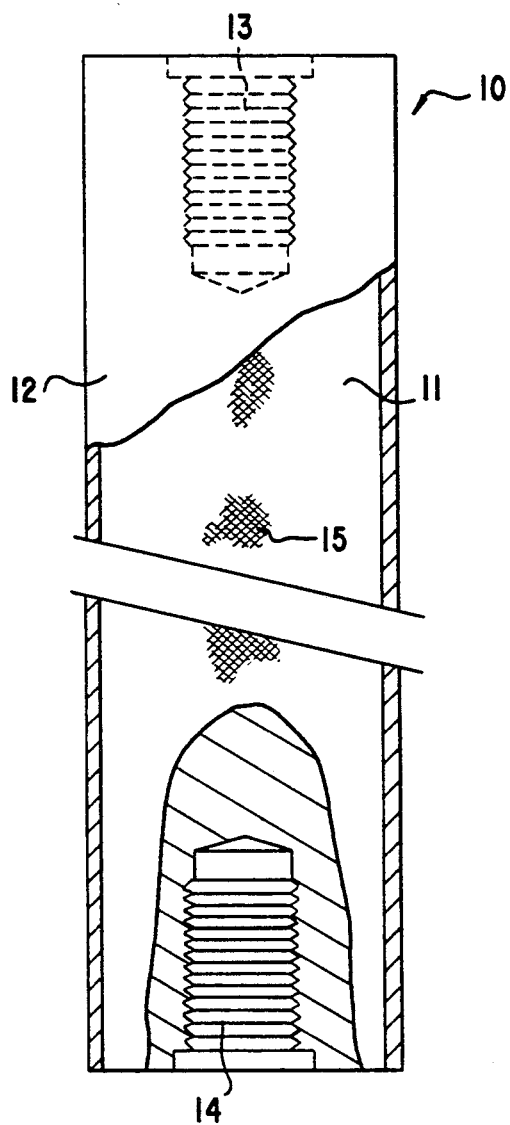
FIG. 1 is a sectional view, with portions broken away, of a clad metal column relating to the first embodiment of this invention.
Figure 2:
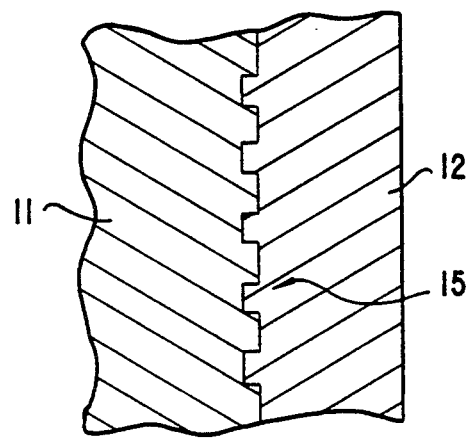
FIG. 2 is a partial enlarged sectional view of said clad metal column.

As shown in FIG. 1, the steel-aluminum clad column 10 relating to the first embodiment of the present invention comprises the core material 11 in the form of a column made of steel (S 25 C, JIS G 4051) having a length of 1500 mm and a diameter of 100 mm, and the aluminum pipe 12 having a thickness of 5 mm which is one example of a good conductor and shields the outer surface of said core material 11.

On the both ends of said core material 11, there are provided female screws 13, 14, each of which is one example of a threaded portion for connection so that the specified number of said steel-aluminum clad columns may be connected via a threaded dowel, which is not shown.

In the case of manufacturing said steel-aluminum clad column 10, the convex-and-concave pattern 15 is formed to the depth of 5/1000–3/10 mm (1/100–1/10 mm is preferable) by knurling on the peripheral surface of the above-mentioned core material 11, which is made of a round bar and cut into the specified length. And then, said core material 11 is inserted into the above-mentioned pipe 12 with a clearance. The successful clearance between the outer surface of the core material 11 and the inner surface of pipe 12 is 0.1 to 1 mm. Then, the above-mentioned pipe 12 is drawn through a die whose diameter is a little smaller than that of the pipe 12, so as to reduce the diameter of the pipe 12. Through this process, by plastic deformation, the inner surface of pipe 12 is bitten into the convex-and-concave pattern formed by knurling to complete a tight fit to the surface of core material 11.

In addition, the above-mentioned drawing action through the die may be substituted by an extrusion (including push out working).

Table 1 shows the shearing strength (A) at the connecting section of steel-aluminum clad column 10 manufactured by the above-mentioned process and the shearing strength (B) at the connecting section of the steel-aluminum clad column manufactured by the method relating to a conventional art.

TABLE 1

| | Shearing strength (bonding force) |
|---|---|
| (A) | 1.2 kg/mm$^2$ |
| (B) | 0.1 kg/mm$^2$ |

As shown in Table 1, therefore, the steel-aluminum clad column 10 manufactured according to the method of present invention has a remarkably large bonding force in the direction of the fitting surface.

In addition, the same shearing strength was present in the case of core material 11 on the surface of which a convex-and-concave pattern was formed by threading, while the convex-and-concave pattern was formed by knurling on the surface of core material 11 in the embodiment disclosed hereinabove.

Figure 3:
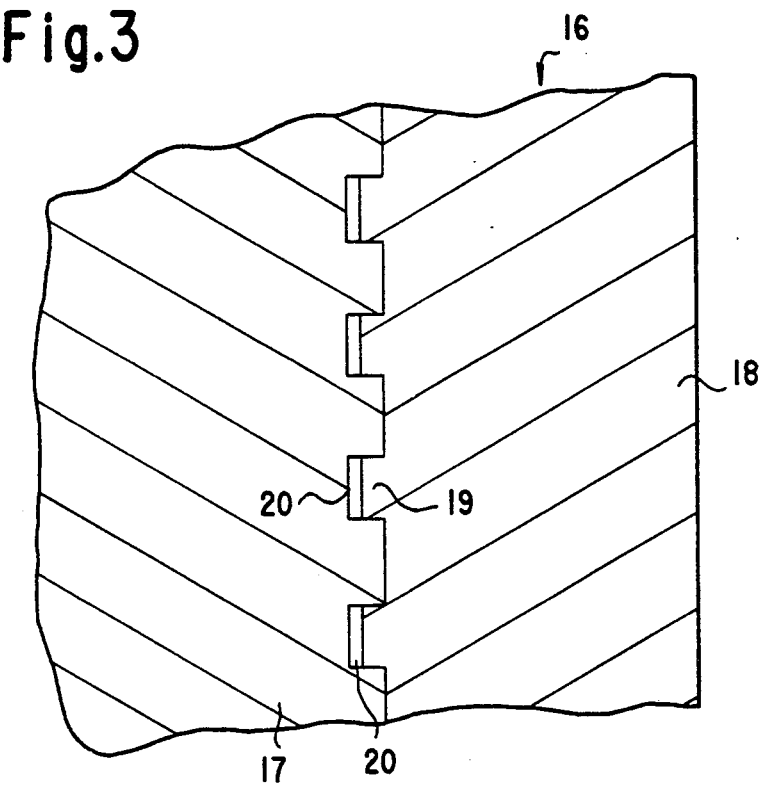
FIG. 3 is a partial enlarged sectional view of a clad metal column relating to the second embodiment of this invention.

The clad metal column 16 relating to the second embodiment of the present invention and manufactured by the above-mentioned method is shown in FIG. 3 and, as shown in the figure, a convex-and-concave pattern is formed on the peripheral surface of a core material 17 which is made of magnetic substance and, onto that surface, an aluminum pipe 18 which is one example of a good conductor is mounted. And, a part of the inner surface of that pipe is bitten into the grooves 19 formed by above-mentioned convex-and-concave pattern, with the space portion 20 remaining at the bottom of each groove.

It has been shown that the above-mentioned space portion 20 reduces the electric loss of the clad metal column for a linear motor and, as a result, improves the efficiency of the pertinent linear motor.

Though the above description discloses the embodiment in the case of using a steel-aluminum clad column, the present invention is applicable to the case in which a pipe made of copper or other good conducting metal, or to the case in which a different convex-and-concave pattern is formed on the peripheral surface of core material.

The present invention is also applicable to the case in which a core material of different diameter or length is used and, furthermore, to the case in which a male screw which is one example of a thread portion for connection is formed at both or either end of said core material.

What is claimed is:

1. A clad metal column for a linear motor, comprising:
   a core material which is provided with a threaded portion for connection at both ends, and made of a magnetic substance on the peripheral surface of which a convex-and-concave pattern including a plurality of longitudinal, transverse, or slanted grooves, or the combination thereof, is formed; and
   a pipe made of a good conductor which is tightly fit onto the outer periphery of said core material by making the inner surface of the pipe bit into the grooves formed by said convex-and-concave pattern,
   wherein a space portion is provided at the bottom of each of said grooves when said pipe is tightly fit onto the outer periphery of said core material.

* * * * *

UNITED STATES PATENT AND TRADEMARK OFFICE
CERTIFICATE OF CORRECTION

PATENT NO. : 5,323,073
DATED : June 21, 1994
INVENTOR(S) : Masaharu Furutani

It is certified that error appears in the above-indentified patent and that said Letters Patent is hereby corrected as shown below:

On title page, item [30] add the following:
—Sept. 10, 1990 [JP]  Japan..................2-240402—.

Signed and Sealed this

Twenty-third Day of May, 1995

Attest:

BRUCE LEHMAN

*Attesting Officer*    *Commissioner of Patents and Trademarks*